United States Patent

Saiia et al.

[11] Patent Number: 5,489,006
[45] Date of Patent: Feb. 6, 1996

[54] SYSTEM AND APPARATUS FOR LIMITING VEHICLE TURNING RADIUS

[75] Inventors: Anthony J. Saiia; Alan R. Fillman, both of Racine, Wis.

[73] Assignee: Textron Inc., Providence, R.I.

[21] Appl. No.: 96,467

[22] Filed: Jul. 23, 1993

[51] Int. Cl.$^6$ ..................................................... B62D 5/06
[52] U.S. Cl. ............................ 180/143; 180/141; 92/13.5; 92/13.6
[58] Field of Search ...................................... 180/143, 132, 180/79, 141; 91/41, 43; 92/13.5, 13.6; 280/90

[56] References Cited

U.S. PATENT DOCUMENTS

| | | | |
|---|---|---|---|
| 2,893,504 | 7/1959 | Jackson. | |
| 2,902,104 | 9/1959 | Schilling. | |
| 2,936,588 | 5/1960 | Van Gerpen. | |
| 3,024,771 | 3/1962 | Criffield et al. | 91/43 |
| 3,085,645 | 4/1963 | Bookout. | |
| 3,249,173 | 5/1966 | Gordon. | |
| 3,279,324 | 10/1966 | Ellis, Jr. | 91/43 |
| 4,109,748 | 8/1978 | Evans | 180/141 |
| 4,349,079 | 9/1982 | Leiber | 180/143 |
| 4,410,193 | 10/1983 | Howard | 280/90 |
| 4,505,109 | 3/1985 | Thomsen et al. | 60/386 |
| 4,558,759 | 12/1985 | Baatrup et al. | 180/132 |
| 5,022,480 | 6/1991 | Inagaki et al. | 180/79.1 |
| 5,086,863 | 2/1992 | Tischer | 92/13.6 |
| 5,092,419 | 3/1992 | Leiber et al. | 180/143 |
| 5,094,312 | 3/1992 | Hakel | 180/148 |

OTHER PUBLICATIONS

Article from Hydraulics & Pneumatics, Nov. 1978.

*Primary Examiner*—Karin L. Tyson
*Assistant Examiner*—Carla Mattix
*Attorney, Agent, or Firm*—Trexler, Bushnell, Giangiorgi & Blackstone, Ltd.

[57] ABSTRACT

A vehicle steering control system and apparatus for controlling steering radius to prevent vehicle and surface damage and to provide improved low speed vehicle maneuverability. The steering control system and apparatus provides a first controllably limited turning radius range in relation to a first condition and a second controllably limited turning radius range in relation to a second condition. Examples of the first and second conditions include speed related conditions, such as, the actual speed of the vehicle, a selected gear of the vehicle, and manual selection of the turning radius. The system and apparatus includes a dual stroke hydraulic cylinder having a cylinder body housing a hydraulically controllable primary piston. A shaft is attached to and extends from the primary piston, projects through the cylinder body, and connects to the steering linkage of the vehicle. Hydraulic operation of the primary piston transfers forces along the shaft to the linkage. First and second hydraulically controllable stroke limiting stops are positioned at each end of the cylinder body. The stops are hydraulically positionable for limiting the stroke length of the primary piston and the attached shaft. A hydraulic control device is associated with the hydraulic cylinder for operating the primary piston and the first and second stops. A mode selection device is associated with the hydraulic control device selecting a desired mode of operation and thus controllably operating the first and second stops to controllably limit the turning radius range of the steering mechanism of the vehicle.

18 Claims, 2 Drawing Sheets

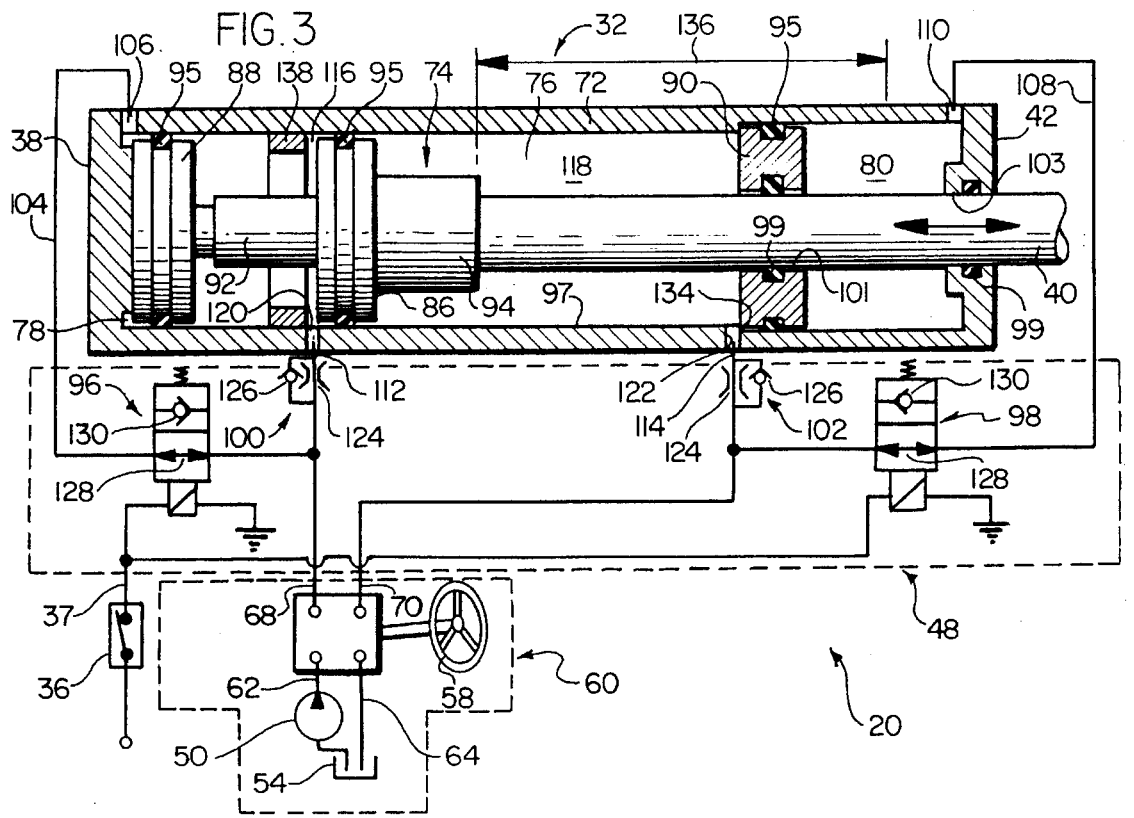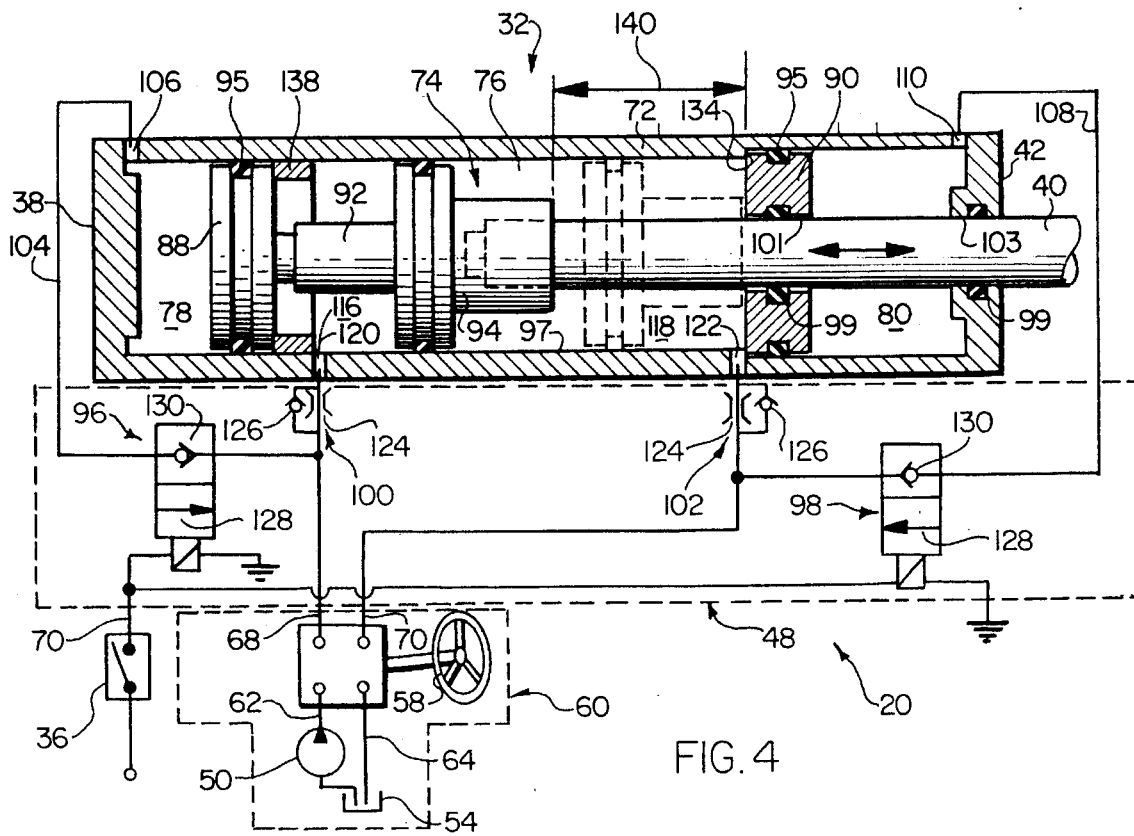

SYSTEM AND APPARATUS FOR LIMITING VEHICLE TURNING RADIUS

BACKGROUND OF THE INVENTION

The present invention relates to vehicle steering control systems and apparatus for limiting the steering radius of a vehicle at elevated speeds to provide improved maneuverability, prevent damage to the steering mechanism, and prevent damage to surfaces over which such vehicles travel, such as, turf. More particularly, the present invention relates to a novel hydraulic steering cylinder for controllably limiting movement of the steering linkage, thereby limiting turning radius.

Numerous wheeled vehicles employ a steering mechanism connected to steered wheels so that the wheels can be operated in a synchronous manner to steer the vehicle. The steering mechanism includes a steering linkage which is constructed to provide a common turning center for the wheels. Often a hydraulic powered steering system is incorporated with the steering mechanism to improve the ease of operation of the steering linkage. Hydraulic powered steering systems are commonly used with a wide variety of motorized vehicles.

A hydraulic cylinder is incorporated in the powered steering system to controllably operate the steering linkage. The hydraulic cylinder houses a single piston which is hydraulically moved in order to drive an attached shaft. The hydraulic cylinder has a stroke length defined by the movement range of the piston in the cylinder. The stroke length in conjunction with the linkage structure determines the range of turning radii achievable using the particular steering mechanism. In other words, the longer stroke length provides a greater turning radius range and thus can achieve a shorter turning radius, whereas the shorter stroke length provides a smaller turning radius range thereby producing a longer turning radius.

Several problems arise with such a hydraulic powered steering mechanism, the foremost problem being the lack of ability to controllably limit turning radius at elevated speeds. An example of vehicles which would benefit from a solution to the turning radius problem include golf course maintenance vehicles, tractors, turf management vehicle of various types, golf carts and small industrial vehicles. These vehicle typically have short wheel bases, are capable of moving quickly, and often are capable of making very tight turns. As a result of the lack of turning radius control in these vehicles the steering mechanism may be damaged when making tight turns at high speeds, as well as, the surfaces over which such vehicles travel, such as turf.

Using a golf course turf management vehicle as an example, the turning radius problems discussed above can result in damage to the vehicle itself, the turf and fairways over which the vehicle travels and make routine tasks less efficient. The turf surfaces of golf courses are very expensive works of landscaping design which require continuous maintenance and protection to preserve desired playing conditions. Turf management vehicles are used to carry out the various tasks which are involved in maintaining and protecting the turf surfaces. The tasks include, among others, mowing, fertilizing, aerating, delivering supplies to various areas of the course, and transporting people.

Often, turf management vehicles are required to travel relatively long distances through the golf course to carry out a task, and as such, must be capable of traveling at increased speeds in the interest of saving time. The turf surface, however, must not be damaged by the vehicles. If the turning radius of a vehicle is not limited while traveling at high speeds, a sharp turn can cause the vehicle to slide or skid on the turf thereby tearing or digging into and damaging the turf. Additionally, at low speeds the vehicles need to be able to make tight turning radius precision maneuvers such as hair pin turns while fertilizing, aerating, mowing, etc. and parking.

Currently available turning radius limiting devices do not accommodate all of the needs of such turf management vehicles. Typically, the available turning radius devices allow tight turning, but in doing so, reduce vehicle speed so that the turf is not damaged when making a tight turn. Alternatively, the available turning radius devices allow higher speeds, but in doing so, correspondingly increase the turning radius to prevent turf damage at the higher speeds. More specifically, one form of turning radius limiting attempts to limit the stroke length of the control or hydraulic cylinder thereby limiting the turning radius range of the steering mechanism. The preferred limit of the turning radius range is defined by the tightest radius which can be achieved at maximum speed with out damaging the steering mechanism or the travel surface. By limiting the turning radius range the vehicle cannot be controlled into a tight turning radius which might cause damage to the steering mechanism or the turf.

Devices which attempt to overcome the above-noted problems include mechanical stops attached to the steering linkage to physically obstruct movement of linkage components. By obstructing the movement or operation of the components of the steering mechanism, the mechanical stops limit operation of the steering mechanism to a predetermined turning radius corresponding to the relationship between the blocks and the component thus blocked. While such mechanical stops provide a limiting effect on the turning radius, they also create problems by restricting turning radius for all speeds. Another problem with the mechanical stops is that they are exposed to the elements and therefore are subject to wear and possible damage. Additionally, mechanical stops, when damaged, may be overridden by forcing the obstructed component past the block or by disassembly and removal of the block from the steering linkage.

Specific examples of the devices generally described above are shown in U.S. Pat. No. 5,022,480 to Inagaki et al. and in U.S. Pat. No. 4,109,748 to Evans. The Inagaki '480 reference shows a steering rack which operates the steering linkage. A mechanical linkage is controllably positioned for mechanically limiting movement of the rack to limit the turning radius of the linkage. This device, however, is dependent upon proper engagement of the mechanical linkage with the rack and as such is subject to failure if the mechanical device does not properly engage the rack. Additionally, if the rack is not properly positioned in relation to the mechanical limiting device, the limiting device will not properly limit the turning radius and may actually interfere with the safe operation of the rack.

The device as shown in Evans '748 employs a pair of mechanical stops which are independently controllably engagable with the left and right steering knuckles to mechanically limit the turning radius of the steering linkage. The limiters as shown in Evans '748, introduce other problems by including additional independent operating components in the steering system. The limiters add to the overall cost and maintenance of the steering system and present another potential failure point to the steering system.

Control or limiting of the turning radius of a vehicle, as described above, has helped, to some degree, prevent damage to vehicles and turf. Prior art limiting devices create other problems by restricting turning radius over the entire speed range of the vehicle and thus greatly affecting maneuverability at low speeds. This is a problem because the turning radius generally does not serve any function at sufficiently low speeds. In other words, the limiting function is primarily only necessary within a high speed range where the combination of variables, such as a tight turning radius and sufficiently high speed, could culminate in damage to the vehicle or turf. As such, the prior art turning radius limiting devices are bothersome, inefficient, and unnecessary at sufficiently low speeds. This problem is exacerbated when one considers the numerous steering functions (i.e. precision maneuvering, hairpin turning such as when mowing, fertilizing, aerating, parking, etc.) which are executed at low speeds. If a tight turning radius is prohibited, such precision steering functions become very time consuming and perhaps impossible.

OBJECTS AND SUMMARY OF THE INVENTION

A general object of the present invention is to provide a novel steering system and control cylinder which functions to improve maneuverability and to prevent vehicle and surface damage by controllably limiting vehicle turning radius.

Another object of the present invention is to provide a steering system which is capable of controllably limiting turning radius in response to a speed related condition.

Still a further object of the present invention is to provide a steering control system which is capable of controlling turning radius automatically without intervention of an operator.

Briefly, and in accordance with the foregoing, the present invention envisions a vehicle steering control system and apparatus for controlling steering radius to prevent vehicle and surface damage and to provide improved low speed vehicle maneuverability. The steering control system and apparatus provides a first controllably limited turning radius range in relation to a first condition and a second controllably limited turning radius range in relation to a second condition. Examples of the first and second conditions include speed related conditions, such as, the actual speed of the vehicle, a selected gear of the vehicle, and manual selection of the turning radius. The system and apparatus includes a dual-stroke hydraulic cylinder having a cylinder body housing a hydraulically controllable primary piston. A shaft is attached to and extends from the primary piston, projects through the cylinder body, and connects to the steering linkage of the vehicle. Hydraulic operation of the primary piston transfers forces along the shaft to the linkage. First and second hydraulically controllable stroke limiting stops are positioned at each end of the cylinder body. The stops are hydraulically positionable for limiting the stroke length of the primary piston and the attached shaft. A hydraulic control device is associated with the hydraulic cylinder for operating the primary piston and the first and second stops. A mode selection device is associated with the hydraulic control device selecting a desired mode of operation and thus controllably operating the first and second stops to controllably limit the turning radius range of the steering mechanism of the vehicle.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 3 is a diagrammatic and schematic view of the steering control system and apparatus of the present invention in the unrestricted turning radius mode as shown in FIG. 2 showing the hydraulic cylinder in a partially fragmentary cross-sectional view in which the primary piston is driven to a far left outboard end of the cylinder; and FIG. 4 is a diagrammatic and schematic view of the steering control system and apparatus of the present invention in a restricted turning radius mode in which first and second stop pistons are fully extended to reduce the stroke length of the primary piston in the cylinder.

DETAILED DESCRIPTION OF THE PREFERRED EMBODIMENT

Figures 1, 2:
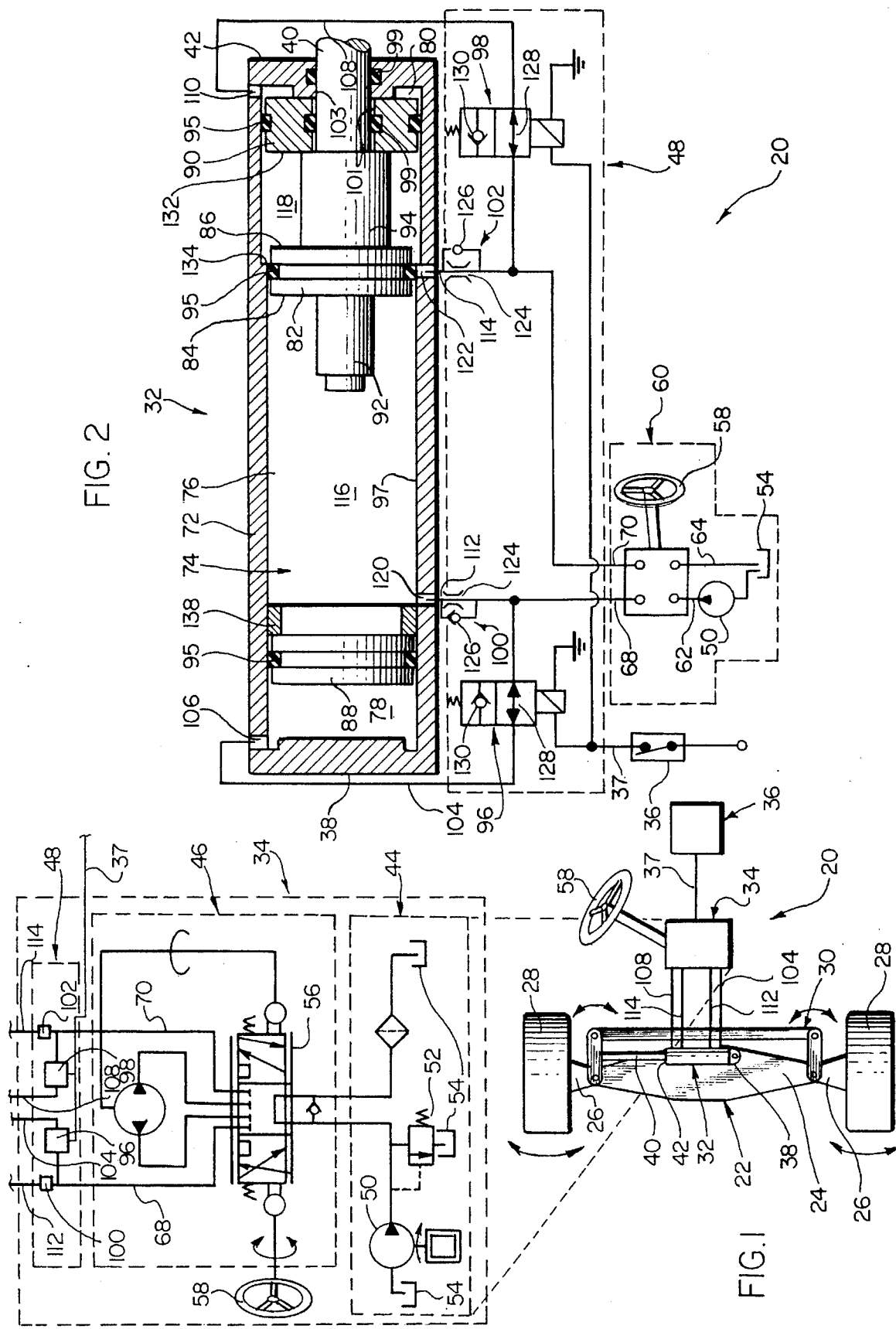
FIG. 1 is a general schematic and diagrammatic top plan view of a steering mechanism in which the steering system and apparatus of the present invention is connected with a vehicle steering linkage for controllably limiting the turning radius of the vehicle.
FIG. 2 is a partial fragmentary, cross sectional, diagrammatic and schematic view of the steering control system and apparatus of the present invention in an unrestricted turning radius mode showing a hydraulic cylinder in a partially fragmentary cross-sectional view in which a primary piston is driven to a far right outboard end of the cylinder.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIG. 1 provides a diagrammatic and schematic illustration of the vehicle steering control system 20 of the present invention. The vehicle steering control system 20 is connected to a vehicle steering mechanism 22 to control the turning radius of the vehicle. The steering mechanism 22 includes a cross member 24, control arms 26 and wheels 28 attached to each end of the cross member 24, and a steering linkage 30. The vehicle steering control system 20 includes a dual stroke control or hydraulic cylinder 32, a hydraulic control assembly 34 communicating with the cylinder 32, and a mode selector 36 coupled to the hydraulic control assembly 34 via control line 37. A first end 38 of the cylinder 32 is attached to the cross member 24 and a shaft 40 extends from a second end 42 of the cylinder 32. The shaft 40 is attached to the linkage 30 such that hydraulically controlled movement of the shaft 40 in the cylinder 32 operates the linkage 30 to controllably turn the vehicle.

The present control system 20 further includes the mode selection means 36 which is coupled with the control assembly 34 via line 37. The mode selection means 36 operates to selectively operate the system 20 in the restricted or unrestricted operating mode. The mode selection means 36 is embodied as a manual switch to be operated by a person of appropriate judgment or an automatic switch which is operated based on a speed related condition. The speed related conditions which could be used to operate the automatic switch of the mode selection means may be defined by a gear selection or the actual speed of the vehicle.

The projected, enlarged schematic of the control assembly 34 as shown in FIG. 1 illustrates the components of the control assembly 34. The control assembly 34 includes a hydraulic supply 44, a steering hand pump 46 coupled to the hydraulic supply 44, and a hydraulic control apparatus 48 coupled to the steering hand pump 46 and the cylinder 32. The hydraulic supply 44 includes a hydraulic pump 50, a relief valve 52, and a reservoir 54. The steering hand pump 46 includes a control cylinder 56 which is hydraulically connected to the hydraulic supply 44 and the hydraulic control apparatus 48 and a steering wheel 58 which is operatively associated with the control cylinder 56 to actuate the control cylinder 56 when steering the vehicle. In use, the steering hand pump 46 provides a user interface to hydraulically steer the vehicle. The hydraulic supply 44 provides a controllable, generally constant pressure source of hydraulic fluid for the control system 20 and collects and recirculates fluid which is drained to the reservoir 54 from the system 20. The steering hand pump 46 and hydraulic supply 44 are devices of known construction and thus are shown in a simplified form in FIGS. 2–4 and referred to generally as a steering pump 60.

As shown in FIGS. 1–4, the hydraulic pump 50 is connected to the control cylinder 56 via hydraulic line 62 and the control cylinder 56 is connected with the reservoir 54 via hydraulic line 64. The control cylinder 56 is connected to the hydraulic control apparatus 48 via a left line 68 and a right line 70. In use, during operation of the system 20 in the unrestricted mode, when the left line 68 is pressurized the right line 70 is connected to the reservoir 54. Similarly, when the right line 70 is pressurized the left line 68 is connected to the reservoir 54. During the restricted mode, either the left or right lines 68,70 will be pressurized as described in greater detail hereinbelow.

With reference to the cylinder 32 as shown in FIGS. 2–4, the cylinder 32 has a hollow body 72 which is sealed at first and second ends 38,42. The hollow body 72 defines a cylinder chamber 74 which is further divisible into a primary chamber 76 comprising a central portion of the cylinder chamber 74, and a left and right outboard chamber 78,80 disposed at each end of the primary chamber 76. A primary piston 82 is centrally positioned in the cylinder chamber 74 and shiftable within the primary chamber 76. The primary piston 82 has opposed left and right surfaces 84,86 facing each of the first and second 38,42 ends of the cylinder 32. First and second hydraulically operated pistons or stops 88,90 are positioned in the left and right outboard chambers 78,80, respectively. The primary piston 82 carries a first abutment structure 92 projecting from the first surface 84, facing the first stop 88, and a second abutment structure 94 projecting from the second surface 86, facing the second stop 90.

O-rings 95 are retained between the piston 82, the first stop 88 and the second stop 90 and an inside surface 97 of the cylinder body 72. The o-rings 95 provide for sealed movement of the piston 82, and first and second stops 88,90 through the cylinder body 72. Additional o-rings 99 are retained in an aperture 101 through the second stop 90 and aperture 103 through the second end 42 through which the shaft 40 attached to the piston 82 extends.

The hydraulic control apparatus 48 includes a left and right controllable solenoid valve 96,98 and a left and right one-way orifice fitting 100,102. The left valve and fitting 96,100 communicates with the left line 68 and the right valve and fitting communicates with the right line 70. The mode selection means 36, described above, is coupled to the solenoid valves 96,98 to controllably operate the valves 96,98. The left valve 96 controls fluid flow through line 104 into and out of the left outboard chamber 78 through left outboard bore 106 and the right valve 98 controls fluid flow through line 108 into and out of the right outboard chamber 80 through right outboard bore 110. The left and right one-way orifice fittings 100,102 control fluid flow through lines 112,114, respectively, into and out of left and right inboard chambers 116,118, respectively, of the primary chamber 76 through chamber bores 120,122.

The one-way orifice fittings 100,102 restrict flow into the corresponding inboard chamber 116,118 of the primary chamber 76 and allow free flow out of the corresponding sub-chamber 116,118. The one-way orifice fittings 100,102 are of a known construction and include a restricting component 124 and a check valve component 126. The restricting component 124 is of a known construction and restricts the flow rate of fluid pumped through the fitting 100,102 into the corresponding inboard chamber 116,118. When fluid is forced out from one of the inboard cylinders 116,118, the flow rate is greater than the restricted flow rate. The check valve component 126 prevents flow therethrough as fluid is pumped into the inboard cylinders 116,118 to maintain the restricted flow rate but allows free flow therethrough when fluid is forced from the inboard cylinders 116,118.

Restriction of flow through the one-way orifice fitting 100,102, creates a pressure differential between the inboard 120,122 and outboard 106,110 bores. Due to the restricted flow into the inboard chambers 116,118, the corresponding outboard chambers 78,80 will experience a higher pressure component of the pressure differential. The one-way orifice fittings 100,102 as described hereinabove are important because they assure that a higher pressure is maintained in the outboard chambers 78,80 relative to the corresponding inboard chambers 116,118.

The solenoid valves 96,98 are coupled for control by the mode selection means 36. Each solenoid valve 96,98 includes a controllable flow through port component 128 and a check valve component 130. When these valves 96,98 are activated, (the mode selection means switch 36 is closed) as shown in the unrestricted operating mode of FIGS. 2 and 3, hydraulic fluid flows through the controllable port component 130 into and out of the outboard chambers 78,80. When the valves 96,98 are deactivated (the mode selection means switch 36 is open), as shown in the restricted operating mode of FIG. 4, the valves 96,98 act as one-way valves and only allow fluid flow through the check valve component 130 into the outboard chambers 78,80.

It is important to note, that disconnection of power from or deactivation of the valves 96,98 in the restricted steering mode results in a system default to the restricted steering mode in the event of a power failure. The restricted steering mode is considered to be the preferred mode of operation in the event power is lost at high speeds. As such, the system provides a control default by virtue of the operation of the switch 36 and the valves 96,98.

FIGS. 2 and 3 show the operation of the present invention in an unrestricted steering mode in the left hand steering position (FIG. 2) and the right hand steering position (FIG. 3). With reference to FIG. 2, the primary piston 82 is positioned to the far right hand side of the cylinder 32. In this position, the rod 40 is fully extended from the cylinder body 72 to provide the desired turning effect on the linkage 30. In order to move from the unrestricted left hand steering position in FIG. 2 to the unrestricted right hand steering position as shown in FIG. 3, the steering hand pump 60 is operated to controllably pump hydraulic fluid to the cylinder 32 through line 70.

As noted above, in the unrestricted mode as shown in FIGS. 2 and 3, the mode selection means 36 is closed thereby allowing the hydraulic fluid to pass through the port component 128 of the valves 96,98. The increased pressure flowing through line 108 and the bore 110 into the right outboard chamber 80 forces the stop 90 to the left. The increased pressure flowing through the right hand line 70 forces movement of the stop 90 and the primary piston 82 to the left. As the stop 90 and primary piston 82 move to the left, the hydraulic fluid in the left inboard chamber flows through the chamber bore 120 and the orifice fitting 100 through line 68 to the reservoir 54. Similarly, hydraulic fluid in the left outboard chamber 78 is forced through the left outboard bore 106 and line 104, through the port component 128 of the solenoid 96 into line 68 and the reservoir 54. Draining of the left outboard chamber 78 allows movement of the stop 88 to the left when structure 92 contacts it.

As pressurization of the right outboard chamber 80 continues, the stop 90 will continue to move to the left until a leading face 132 of the stop 90 abuts a limiting portion 134. The stop 90 is held against the limiting portion 134 due to the higher pressure at bore 110 compared to the pressure at bore 122. Continued pumping of hydraulic fluid through line 70 flows through bore 122 to further expand the right inboard chamber 118 and move the primary piston 82 to the left. Movement of the primary piston 82 to the left retracts the shaft 40 into the cylinder 72 thereby affecting a desired turning effect on the linkage 30.

With continued application of pressure through line 70, the primary piston 82 will ultimately contact the stop 88. When the first abutment structure 92 on the left side of the primary piston 82 abuts the first stop, the piston 82 will drive the stop 88 to the left. Movement of the stop 88 to the left is affected by a greater pressure differential in the right inboard chamber 118 acting on the right face 86 of the primary piston compared to the pressure in the left inboard chamber 116 or the left outboard chamber 78. Continued pressurization through line 70 results in continued draining through line 68. Eventually, the stop 88 is driven to a point, as shown in FIG. 3, where the stop 88 is prevented from further movement by contact with the inside surface of the first end 38 of the cylinder 32.

As shown in FIG. 3, movement of the primary piston 82 from the position as shown in FIG. 2 to the position as shown in FIG. 3 defines a stroke length (as represented by dimension arrow 136) or movement of the shaft 40. The piston 82 can be moved to the right to fully extend the shaft 40 from the body 72 to perform a desired turning function on the linkage 30. In this regard, the process of pressurizing the left outboard chamber 78, in a similar manner to the right outboard 80 as described hereinabove, initiates the movement of the primary piston 82 to the right. The left outboard chamber 78 is pressurized by hydraulic fluid pumped through line 68 and through the port component 128 of the solenoid 96 via line 104 and bore 106. As the pressure builds in the left outboard chamber 78, the stop 88 is moved to the right thereby driving the primary piston 82 to the right. The stop 88 can be controllably moved to the right to a point upon which it contacts a limiting portion 138. The stop 88 is held in contact with the limiting portion 138 due to the higher pressure at bore 106. As hydraulic fluid continues to be pumped through line 68 into the left inboard chamber 116 through bore 120, further pressurization of the left inboard chamber 116 continues to drive the primary piston 82 to the right.

Continued pumping of hydraulic fluid through line 68 continues to expand the left inboard chamber 116 until a point when the second abutment structure 94 projecting from the second surface 86 of the primary piston 82 contacts the stop 90. Due to the increased pressure on the left hand side of the piston 82, the piston drives the stop 90 to the right. The fluid in the right inboard chamber 118 and the right outboard chamber 80 is drained through the bores 122, 110 through line 70 and into the reservoir 54. Draining of hydraulic fluid from the right inboard chamber 118 and right outboard chamber 110 allows continued movement of the primary piston 82 to the right. Eventually, upon continued pressurization through line 68, the condition as shown in FIG. 2 will be achieved whereby the shaft 40 is fully extended from the cylinder body 72.

When the mode selection means 36 is operated to deactivate the valves 96,98, the valves 96,98 act as one-way check valves only allowing hydraulic fluid to flow into, but not out of the outboard chambers 78,80. Hydraulic fluid flow through the restricted orifice fittings 100,102 creates a higher pressure at the left and right bores 106,110 thereby expanding the corresponding outboard chambers 78,80 and driving the corresponding stops 88,90 inboard towards the middle of the cylinder body 32. As noted hereinabove, the corresponding left and right limiting portions 138, 134 limit the overall movement of the stops 88,90. Hydraulic fluid accumulated in left and right outboard chambers 78,80 is prevented from flowing back through the valves 96,98 by the check valve component 130 of each valve. The stops 88,90 are retained in the inboard positions as shown in FIG. 4 until the solenoid valves 96,98 are once again activated thereby allowing fluid to drain through the corresponding lines 68, 70 to the reservoir 54.

In the restricted mode as shown in FIG. 4, the piston is limited to movement within the reduced or restricted limits of the primary chamber 76 as defined by the inboard shifted stops 88,90. The stroke length (as indicated by dimension arrow 140) is reduced compared to the stroke length 136 of the unrestricted mode as shown in FIGS. 2 and 3. As such, the turning radius is restricted such that the turning radius range is decreased compared to the turning radius range in the unrestricted mode (FIGS. 2,3).

In the restricted mode as shown in FIG. 4, movement of the primary piston 82 in the restricted primary chamber 76 is provided solely by pressurization through the fittings 100,102. Movement to the left or right is affected by pressurization on the left face 84 or right face 86 of the primary piston 82. For example, when moving the primary piston 82 from the right (as shown in phantom line in FIG. 4) to the left, thereby retracting the shaft 40 into the cylinder body 72, pressurized hydraulic fluids is pumped by the steering pump 60 through line 70 creating a higher pressure in the right inboard chamber 118 to drive the piston 82 to the left. The increased pressure in the inboard chamber 118 does not affect the restricted mode position of the corresponding right hand stop 90 due to the one-way check valve component 130 in the solenoid valve 98. If, for any reason, there is a reduction in pressure in the right outboard chamber 80, the restricting operation of the right hand fitting 102 will result in additional fluid being pumped through the one-way check valve 130 of the right hand solenoid valve 98 and into the right outboard chamber 80. As such, in the restricted mode, the stops 88,90 will be maintained in their inboard position against the corresponding limiting portions 138, 134. As the piston 82 is driven to the left, the abutment portion 92 will contact the left stop 88. The one-way check valve component 130 of the left solenoid valve 96 prevents release of the fluid in the left outboard chamber 78 and thereby prevents movement of the left stop 88 to the left.

In use, the control system 20 of the present invention includes the dual stroke hydraulic cylinder 32 which is controllably operated to extend and retract the shaft 40 from the cylinder body 72. Movement of the shaft 40 controllably actuates the linkage 30 to affect a desired steering motion to the wheels 28 of the steering mechanism 22. The control system operates in one of the two operating modes described hereinabove, the unrestricted turning radius range mode as shown in FIGS. 2 and 3 or the restricted turning radius range mode as shown in FIG. 4. In the unrestricted turning radius range mode as shown in FIGS. 2 and 3, the vehicle is allowed to make sharp or tight turns. The tight turning action results from the unrestricted stroke length 136 of the shaft 40. In the restricted mode, the vehicle is prohibited from making tight turns and restricted to a limited turning radius range. The limited turning radius range results in wider turning radii due to the increased stroke length 140 of the shaft 40 in the cylinder 32.

The hydraulic control apparatus 48 includes controllable solenoid valves 96,98 and one-way restricted orifice fittings 100,102. The valves 96,98 and fittings 100,102 are connected in parallel to the steering pump 60 via the corresponding hydraulic lines 68,70. Pressurization of the left or right hydraulic lines 68,70 by the steering pump 60 pumps hydraulic fluid to the corresponding valve and fitting pair (96,100 or 98,102). For example, when fluid is pumped through line 68 into the valve and fitting pair 96,100, the restricted flow through the fitting 100 creates a pressure differential with increased pressure being supplied to the left outboard chamber 78. By pressurizing the left outboard chamber 78, movement of the stop 88 is affected. Similar movement of the right stop 90 can be achieved by pressurizing the right hydraulic line 70.

In the unrestricted mode, the solenoid valves 96,98 are activated to allow fluid to flow into and out of the corresponding outboard chambers 78,80. In the restricted modes, the solenoid valves 96,98 are deactivated to allow pressure to be built up in the left and right hand outboard chambers 70,80 thereby forcing the stops 88,90 against the corresponding limiting portions 138,134. The restricted mode results in a reduced stroke length 140 whereas the unrestricted mode results in a greater stroke length 136.

In summary, the present invention provides a unitary hydraulic control cylinder 32 which is attached by way of a movable shaft or rod 40 to the linkage 30. The cylinder 32 internally houses the primary piston 82 and the movable stops 88,90. The hydraulically controlled pistons 82,88,90 are controlled by the hydraulic control apparatus 48. The economy of the design of the present invention improves reliability by reducing the complexity and number of components in the system and thereby reduces the overall cost, size, maintenance, and ease of repair.

The system 20 operates in two modes, a full turning mode (shown in FIGS. 2 and 3) or a restricted turning mode (shown in FIG. 4). Different stroke lengths could be achieved by changing the length of chambers 76, 78 and 80. In the full turning mode (FIGS. 2,3), the primary piston 82 has a maximized stroke length 136, thus allowing a smaller turning radius and a tighter turning response. In the restricted operating mode (FIG. 4), the primary piston 82 travels over a restricted stroke length 140, thus prohibiting a smaller turning radius resulting in a wider turning response.

The present invention helps to improve maneuverability and minimize the possibility of high speed, tight turning, turf damage and further provides a fail safe in that the valves 96,98 are only powered in the unrestricted or tight turning mode. In this regard, the default mode will be the restricted turning mode, such that if the power is disabled, the valves 96,98 will operate in the default mode and restrict the turning radius of the vehicle. The present invention also preserves turf surfaces such as golf greens and the like by preventing high speed sharp turning. When high speed sharp turning is restricted on vehicles employing the present invention, they are prohibited from tearing up or forcibly skidding on such turf surfaces thereby preventing damage to the turf surface. This is important in that turf surfaces such as golf greens can be very expensive to construct and maintain.

While a preferred embodiment of the present invention is shown and described, it is envisioned that those skilled in the art may devise various modifications of the present invention without departing from the spirit and scope of the appended claims. The invention is not intended to be limited by the foregoing disclosure.

We claim:

1. A vehicle steering control system for adjustably controlling the active, unlocked steering radius as a function of a selected operating mode of said vehicle, said vehicle being of the type having a steering mechanism including a steering linkage for directing the movement of said vehicle, said steering control system providing a restricted turning radius range during a restricted, unlocked operating mode and a generally unrestricted turning radius range during an unrestricted operating mode, said steering control system comprising:

a dual stroke hydraulic cylinder having a hydraulically controllable primary piston being operatively associated with said linkage for controllably applying moving forces to said linkage to steer said vehicle, said primary piston having a dual sided head and a shaft extending from one side of said head, said shaft being operatively associated with said linkage; and first and second hydraulically controllable stops being movably housed in said cylinder, said head of said primary piston being positioned between said first and second stops in said cylinder, said first and second stops being adjustably controllable for adjustably limiting the stroke range of said primary piston in said restricted, unlocked operating mode for adjusting the turning radius of said vehicle.

2. A vehicle steering control system as recited in claim 1, further comprising a manual turning radius selection control for selecting one of a restricted operating mode turning radius range or an unrestricted operating mode turning radius range.

3. A vehicle steering control system as recited in claim 1, further comprising:

hydraulic control means operatively associated with said cylinder for controllably hydraulically actuating movement of said primary piston and said first and second stops in response to a selected operating mode.

4. A vehicle steering control system for adjustably controlling steering radius as a function of a selected operating mode of said vehicle, said vehicle being of the type having a steering mechanism including a steering linkage for directing the movement of said vehicle, said steering control system providing a restricted turning radius range during a restricted operating mode and a generally unrestricted turning radius range during an unrestricted operating mode, said steering control system comprising:

a dual stroke hydraulic cylinder having a hydraulically controllable primary piston being operatively associated with said linkage for controllably applying moving forces to said linkage to steer said vehicle, said primary piston having a dual sided head and a shaft extending from one side of said head, said shaft being operatively associated with said linkage;

first and second hydraulically controllable stops being movably housed in said cylinder; said head of said primary piston being positioned between said first and second stops in said cylinder: said first and second stops being adjustably controllable for adjustably limiting the stroke range of said primary piston in said restricted mode for adjusting the turning radius of said vehicle; hydraulic control means operatively associated with said cylinder for controllably hydraulically actuating movement of said primary piston and said first and second stops in response to a selected operating mode; and said hydraulic control means including a hydraulic control apparatus including a first controllable solenoid valve having a first one-way orifice fitting operatively associated with said first hydraulically controllable stop and a second controllable solenoid valve having a second one-way orifice fitting operatively associated with said second hydraulically controllable stop, said first controllable solenoid valve selectively communicating with a first outboard chamber defined between said first hydraulically controllable stop and an opposing surface of said cylinder, said second controllable solenoid valve selectively communicating with a second outboard chamber defined between said second hydraulically controllable stop and an opposing surface of said cylinder, said first one-way orifice fitting selectively communicating with a first inboard chamber defined between said first hydraulically controllable stop and an opposing surface of said primary piston, said second one-way orifice fitting selectively communicating with a second inboard chamber defined between said second hydraulically controllable stop and an opposing surface of said primary piston.

5. A vehicle steering control system as recited in claim 3, further comprising:

means operatively associated with said hydraulic control means for selecting one of a restricted or unrestricted operating mode, said mode selection means operating said hydraulic control means in response to the selected mode.

6. A vehicle steering control system as recited in claim 5, wherein said mode selection means includes means for sensing the speed of said vehicle, said sensing means transmitting a control signal to said hydraulic control means dependent on the speed of the vehicle, said hydraulic control means actuating said first and second stops to restrict the stroke range of said primary piston in said cylinder when a control signal corresponding to a restricted operating mode is transmitted by said sensing means to decrease the turning radius range of said vehicle, and said hydraulic control means actuating said first and second stops to unrestrict the stroke range of said primary piston in said cylinder when a control signal corresponding to a generally unrestricted operating mode is transmitted by said sensing means to increase the turning radius range of said vehicle.

7. A vehicle steering control system as recited in claim 5, wherein said mode selection means includes means for sensing a driving gear selection of said vehicle, said sensing means transmitting a control signal to said hydraulic control means dependent on said gear selection, said hydraulic control means actuating said first and second stops to restrict the stroke range of said primary piston in said cylinder when a gear selection control signal corresponding to a restricted operating mode is transmitted by said sensing means to decrease the turning radius range of said vehicle, and said hydraulic control means actuating said first and second stops to unrestrict the stroke range of said primary piston in said cylinder when a gear selection control signal corresponding to an unrestricted operating mode is transmitted by said sensing means to increase the turning radius range of said vehicle.

8. A vehicle steering control system for adjustably controlling steering radius as a function of a selected operating mode of said vehicle, said vehicle being of the type having a steering mechanism including a steering linkage for directing the movement of said vehicle, said steering control system providing a restricted turning radius range during a restricted operating mode and a generally unrestricted turning radius range during an unrestricted operating mode, said steering control system comprising:

a dual stroke hydraulic cylinder having a cylinder body defining a cylinder chamber having a primary chamber and two outboard chambers, said outboard chambers being spaced apart at opposite ends of said cylinder chamber with said primary chamber being disposed therebetween, a hydraulically controlled primary piston movably retained in said primary chamber, said primary piston being operatively associated with said linkage for controllably applying moving forces to said linkage to steer said vehicle, said primary piston having a dual sided head and a shaft extending from one side of said head, said shaft being operatively associated with said linkage, each side of said primary piston facing a corresponding one of said two outboard chambers; first and second hydraulically controllable stops being movably housed in said cylinder, said first stop being movably retained in a first outboard chamber, said second stop being movably retained in a second outboard chamber, said head of said primary piston being positioned between said first and second stops in said cylinder, said first and second stops being controllable for limiting the stroke range of said primary piston in said restricted mode for controlling the turning radius of said vehicle; and said hydraulic control means communicating with opposite ends of said primary chamber for hydraulically shifting said primary piston in said primary chamber, said hydraulic control means communicating with distal ends of said outboard chambers for controllably hydraulically shifting said first and second stops retained in said outboard chambers towards said primary chamber.

9. A vehicle steering control system as recited in claim 8, said hydraulic control means further comprising:

a hydraulic control apparatus including a first controllable solenoid valve having a first one-way orifice fitting operatively associated with said first hydraulically controllable stop at one end of said primary chamber and a second controllable solenoid valve having a second one-way orifice fitting operatively associated with said second hydraulically controllable at an opposite end of said primary chamber;

said first controllable solenoid valve selectively communicating with said first outboard chamber, said second controllable solenoid valve selectively communicating with said second outboard chamber, said first one-way orifice fitting selectively communicating with a corresponding end of said primary chamber between said first hydraulically controllable stop and an opposing surface of said primary piston, said second one-way orifice fitting selectively communicating with a corresponding end of said primary chamber between said second hydraulically controllable stop and an opposing surface of said primary piston.

10. A vehicle steering control system as recited in claim 8, further comprising:

a protrusion projecting from each face of said primary piston, said protrusions abutting a corresponding face of one of said first and second stops when said primary piston is hydraulically shifted thereagainst for maintaining a gap between said primary piston and said corresponding face of one of said first and second stops, said gap communicating with said hydraulic control system for receiving hydraulic fluid to shift said primary piston away from said corresponding face of one of said first and second stops.

11. A vehicle steering control system for adjustably controlling the active, unlocked turning radius of a vehicle as a function of an operating mode of said vehicle, said vehicle, being of the type having a steering mechanism including a steering linkage operatively associated with said vehicle steering control system, said steering control system providing a restricted, unlocked turning radius range during a restricted operation mode, and a generally unrestricted turning radius range during an unrestricted, unlocked operating mode, said steering control system comprising:

a cylinder body defining a cylinder chamber having a primary chamber and two outboard chambers, said outboard chambers being spaced apart at opposite ends of said cylinder chamber with said primary chamber being positioned therebetween;

a dual sided primary piston being movably retained in said primary chamber, each side of said primary piston facing a corresponding outboard chamber;

a shaft attached to said primary piston extending from said cylinder body and being operatively associated with said steering linkage for transferring forces from said primary piston to aid steering linkage;

a first stroke stop being movably retained in a first outboard chamber;

a second stroke stop being movably retained in a second outboard chamber; and hydraulic control means operatively associated with said primary chamber and said outboard chambers for adjustably controllably shifting said primary piston and first and second stops in response to a selected, unlocked operation mode, said hydraulic control means communicating with opposite ends of said primary chamber for adjustably controllably hydraulically shifting said primary piston in said primary chamber, said hydraulic control means communicating with distal ends of said outboard chambers for controllably hydraulically shifting said first and second stops retained in said outboard chambers.

12. A vehicle steering control system for adjustably controlling the turning radius of a vehicle as a function of an operating mode of said vehicle, said vehicle, being of the type having a steering mechanism including a steering linkage operatively associated with said vehicle steering control system: said steering control system providing a restricted turning radius range during a restricted operation mode, and a generally unrestricted turning radius range during an unrestricted operating mode, said steering control system comprising:

a cylinder body defining a cylinder chamber having a primary chamber and two outboard chambers, said outboard chambers being spaced apart at opposite ends of said cylinder chamber with said primary chamber being positioned therebetween;

a dual sided primary piston being movably retained in said primary chamber; each side of said primary piston facing a corresponding outboard chamber;

a shaft attached to said primary piston extending from said cylinder body and being operatively associated with said steering linkage for transferring forces from said primary piston to aid steering linkage;

a first stroke stop being movably retained in a first outboard chamber;

a second stroke stop being movably retained in a second outboard chamber; and hydraulic control means operatively associated with said primary chamber and said outboard chambers for adjustably controllably shifting said primary piston and first and second stops in response to a selected operation mode, said hydraulic control means communicating with opposite ends of said primary chamber for adjustably controllably hydraulically shifting said primary piston in said primary chamber, said hydraulic control means communicating with distal ends of said outboard chambers for controllably hydraulically shifting said first and second stops retained in said outboard chambers; and said hydraulic control means including a hydraulic control apparatus including a first controllable solenoid valve having a first one-way orifice fitting communicating with one end of said cylinder chamber and operatively associated with said first hydraulically controllable stop, and a second controllable solenoid valve having a second one-way orifice fitting communicating with an opposite end of said cylinder chamber and operatively associated with said second hydraulically controllable stop;

said first controllable solenoid valve selectively communicating with said first outboard chamber, said second controllable solenoid valve selectively communicating said second outboard chamber;

said first one-way orifice fitting selectively communicating with a corresponding end of said primary chamber between said first hydraulically controllable stop and an opposing surface of said primary piston, said primary piston, said second one-way orifice fitting selectively communicating with a corresponding end of said primary chamber between said second hydraulically controllable stop and an opposing surface of said primary piston.

13. A vehicle steering control system as recited in claim 11, further comprising a manual turning radius selection control for selecting one of a restricted operating mode turning radius range or an unrestricted operating mode turning radius range.

14. A vehicle steering control system as recited in claim 11, further comprising means operatively associated with said hydraulic control means for selecting an operating mode, said mode selection means operating said hydraulic control means in response to a speed related condition of said vehicle.

15. A vehicle steering control system as recited in claim 14, wherein said mode selection means includes means for sensing the speed of said vehicle, said sensing means transmitting a control signal to said hydraulic control means dependent on the speed of the vehicle, said hydraulic control means actuating said first and second stops to restrict the stroke range of said primary piston in said cylinder when a control signal corresponding to a restricted operating mode is transmitted by said sensing means to decrease the turning radius range of said vehicle, and said hydraulic control means actuating said first and second stops to unrestrict the stroke range of said primary piston in said cylinder when a control signal corresponding to a generally unrestricted operating mode is transmitted by said sensing means to increase the turning radius range of said vehicle.

16. A vehicle steering control system as recited in claim 14, wherein said mode selection means includes means for sensing a driving gear selection of said vehicle, said sensing means transmitting a control signal to said hydraulic control means dependent on said gear selection, said hydraulic control means actuating said first and second stops to restrict the stroke range of said primary piston in said cylinder when a gear selection control signal corresponding to a restricted operating mode is transmitted by said sensing means to decrease the turning radius range of said vehicle, and said hydraulic control means actuating said first and second stops to unrestrict the stroke range of said primary piston in said cylinder when a gear selection control signal corresponding to an unrestricted operating mode is transmitted by said sensing means to increase the turning radius range of said vehicle.

17. A dual stroke hydraulic cylinder for use in a vehicle steering control system to control the active, unlocked turning radius of a vehicle, said vehicle being of the type having a steering mechanism including a steering linkage, said dual stroke hydraulic cylinder providing a generally unrestricted, unlocked vehicle turning radius range during a first mode, and an adjustable restricted, unlocked vehicle turning radius range during a second mode, said dual stroke hydraulic cylinder comprising:

- a cylinder body defining a cylinder chamber having a primary chamber and two outboard chambers, said outboard chambers being spaced apart at opposite ends of said cylinder chamber with said primary chamber being positioned therebetween;
- a dual sided primary piston being movably retained in said primary chamber, each side of said primary piston facing a corresponding one of said two outboard chambers, a shaft being attached to said piston and extending from one end of said cylinder body and being operatively associated with said steering linkage for transferring forces from movement of said primary piston to said steering linkage;
- a first stroke stop being hydraulically movable and retained in a first outboard chamber;
- a second stroke stop being hydraulically movable and retained in a second outboard chamber;
- said first and second stroke stops being adjustably controllably shifted in said first and second outboard chambers towards and away form said primary chamber for adjustably limiting the stroke range of said primary piston and attached shaft to control said vehicle radius range.

18. A dual stoke hydraulic cylinder for use in a vehicle steering control system to control turning radius of a vehicle, said vehicle being of the type having a steering mechanism including a steering linkage, said dual stroke hydraulic cylinder providing a generally unrestricted vehicle turning radius range during a first mode, and an adjustable restricted vehicle turning radius range during a second mode, said dual stroke hydraulic cylinder comprising:

- a cylinder body defining a cylinder chamber having a primary chamber and two outboard chambers, said outboard chambers being spaced apart at opposite ends of said cylinder chamber with said primary chamber being positioned therebetween;
- a dual sided primary piston being movably retained in said primary chamber, each side of said primary piston facing a corresponding one of said two outboard chambers, a shaft being attached to said piston and extending from one end of said cylinder body and being operatively associated with said steering linkage for transferring forces from movement of said primary piston to said steering linkage;
- a first stroke stop being hydraulically movable and retained in a first outboard chamber;
- a second strike stop being hydraulically movable and retained in a second outboard chamber;
- said first and second stroke stops being adjustably controllably shifted in said first and second outboard chambers towards and away form said primary chamber for adjustably limiting the stroke range of said primary piston and attached shaft to control said vehicle radius range; and
- a protrusion projecting from each face of said primary piston, said protrusions abutting a corresponding face of one of said first and second stop when said primary piston is hydraulically shifted thereagainst for maintaining a gap between said piston and said corresponding face of one of said first and second stops, said gap communicating with said hydraulic control system for receiving hydraulic fluid to shift said primary piston away from said corresponding face of one of said first and second stops.

* * * * *